United States Patent
Macken et al.

(10) Patent No.: US 10,366,720 B2
(45) Date of Patent: Jul. 30, 2019

(54) OXIDATION RESISTANT SENSOR FOR HEAT-ASSISTED MAGNETIC RECORDING

(71) Applicant: Seagate Technology LLC, Cupertino, CA (US)

(72) Inventors: Declan Macken, Eden Prairie, MN (US); Paul Julio Sonda, Minneapolis, MN (US); Peter Kevin McGeehin, Letterkenny (IE)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/692,957

(22) Filed: Aug. 31, 2017

(65) Prior Publication Data

US 2019/0066719 A1    Feb. 28, 2019

(51) Int. Cl.
| | |
|---|---|
| *G11B 5/60* | (2006.01) |
| *G11B 5/31* | (2006.01) |
| *G11B 5/255* | (2006.01) |
| *G11B 5/40* | (2006.01) |
| *G11B 5/39* | (2006.01) |
| *G11B 5/127* | (2006.01) |
| *G11B 5/00* | (2006.01) |

(52) U.S. Cl.
CPC .......... *G11B 5/6076* (2013.01); *G11B 5/1278* (2013.01); *G11B 5/255* (2013.01); *G11B 5/314* (2013.01); *G11B 5/3106* (2013.01); *G11B 5/3967* (2013.01); *G11B 5/40* (2013.01); *G11B 5/6088* (2013.01); *G11B 5/607* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 8,451,696 B2 | 5/2013 | Huang et al. | |
| 8,654,618 B1* | 2/2014 | Liu et al. | G11B 5/314 369/13.33 |
| 8,842,383 B1* | 9/2014 | Balamane et al. | G11B 5/314 369/13.33 |
| 9,159,349 B2 | 10/2015 | Peng et al. | |
| 9,508,368 B2 | 11/2016 | Gage et al. | |
| 9,972,350 B1* | 5/2018 | Macken et al. | G11B 5/6088 |
| 2012/0201108 A1* | 8/2012 | Zheng et al. | G11B 5/6076 360/59 |
| 2013/0107390 A1* | 5/2013 | Huang et al. | G11B 5/6088 360/59 |
| 2013/0107680 A1* | 5/2013 | Contreras et al. | G11B 5/314 369/13.32 |
| 2013/0286805 A1* | 10/2013 | Macken et al. | G11B 5/314 369/13.33 |

* cited by examiner

*Primary Examiner* — Craig A. Renner
(74) *Attorney, Agent, or Firm* — Hollingsworth Davis, LLC

(57) ABSTRACT

An apparatus comprises a slider comprising an air bearing surface (ABS) and configured for heat-assisted magnetic recording. The slider includes a writer and a reader at the ABS, a near-field transducer (NFT) proximate the writer, and an optical waveguide optically coupled to a laser source and the NFT. The slider further includes a sensor configured to contact and sense thermal asperities of a magnetic recording medium. The sensor is formed from one of Ru, Rh, Pd, Os, Ir, and Pt.

18 Claims, 8 Drawing Sheets

OXIDATION RESISTANT SENSOR FOR HEAT-ASSISTED MAGNETIC RECORDING

SUMMARY

Embodiments are directed to an apparatus comprising a slider having an air bearing surface (ABS) and configured for heat-assisted magnetic recording (HAMR). The slider comprises a writer and a reader at the ABS, a near-field transducer (NFT) proximate the writer, and an optical waveguide optically coupled to a laser source and the NFT. The slider further comprises a sensor configured to contact and sense thermal asperities of a magnetic recording medium, and the sensor is formed from one of Ru, Rh, Pd, Os, Ir, and Pt.

Further embodiments are directed to an apparatus comprising a slider having an air bearing surface and being configured for heat-assisted magnetic recording. The slider comprises a writer and a reader at the air bearing surface, a near-field transducer proximate the writer, and an optical waveguide optically coupled to a laser source and the near-field transducer. The slider further includes a sensor configured to contact and sense thermal asperities of a magnetic recording medium. The sensor is surrounded at least in part by a dielectric material and is formed from one of Ru, Rh, Pd, Os, Ir, and Pt. An adhesion layer is disposed between the sensor and the dielectric material.

Additional embodiments are directed to an apparatus comprising a slider comprising an air bearing surface and configured for heat-assisted magnetic recording. The slider comprises a writer and a reader at the air bearing surface, a near-field transducer proximate the writer, and an optical waveguide optically coupled to a laser source and the near-field transducer. The slider further includes a sensor configured to contact and sense thermal asperities of a magnetic recording medium, and the sensor is formed from one of Ru, Rh, Pd, Os, Ir, and Pt. A protective coating covers at least a portion of the air bearing surface including the writer, reader, near-field transducer, and sensor. The sensor is configured to operate at a temperature between about 135° C. and 150° C., which degrades the protective coating and exposes the sensor leaving the sensor unprotected.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification, the appended drawings are referenced wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure relates to heat-assisted magnetic recording (HAMR), which can be used to increase areal data density of magnetic media. HAMR may also be referred to as energy assisted magnetic recording (EAMR), thermally assisted magnetic recording (TAMR), and thermally assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, a magnetoresistive sensor reads data by detecting magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider also includes a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., ABS, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region reaching or exceeding the Curie temperature ($T_c$) and having dimensions less than 100 nm (e.g., ~50 nm).

Figure 1:
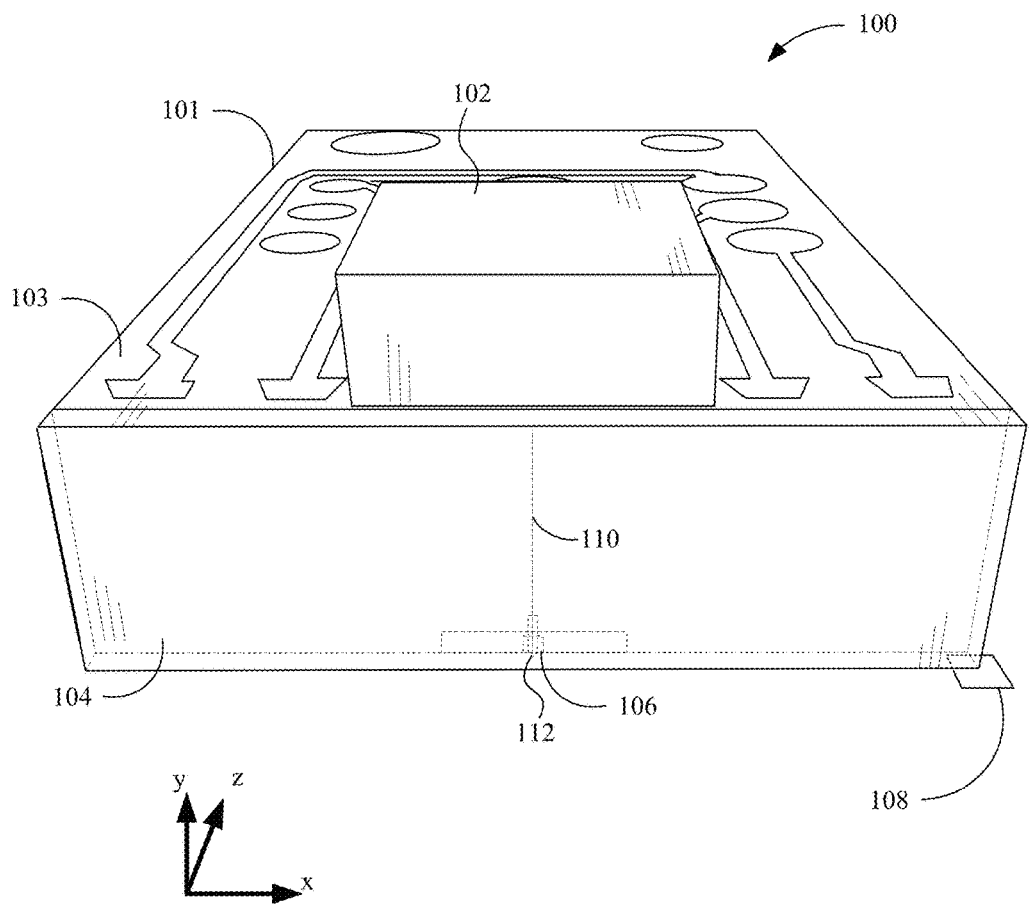
FIG. 1 is a perspective view of a HAMR slider assembly according to embodiments discussed herein.

With reference to FIG. 1, a perspective view shows a HAMR slider assembly 100 according to a representative embodiment. The slider assembly 100 includes a laser diode 102 located on input surface 103 of a slider body 101. In this example, the input surface 103 is a top surface, which is located opposite a media-facing surface 108 that is positioned over a surface of a recording media (not shown) during device operation. The media-facing surface 108 faces, and is held proximate to, the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy heats the recording media as it passes by the read/write head 106. Optical coupling components, such as a waveguide system 110, are integrally formed within the slider body 101 (e.g., near a trailing edge surface 104 of the slider) and function as an optical path that delivers energy from the laser diode 102 to the recording media via a NFT 112. The NFT 112 is proximate the writer of the read/write head 106 and causes heating of the media during recording operations.

The laser diode 102 may be configured as either an edge-emitting laser or surface-emitting laser. While the representative embodiment in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be externally mounted to the slider 100, and coupled to the slider by way of optic fiber and/or a waveguide. An input surface of the slider body 103 may include a grating or other coupling feature to receive light from the laser via the optic fiber and/or waveguide.

Figure 2:
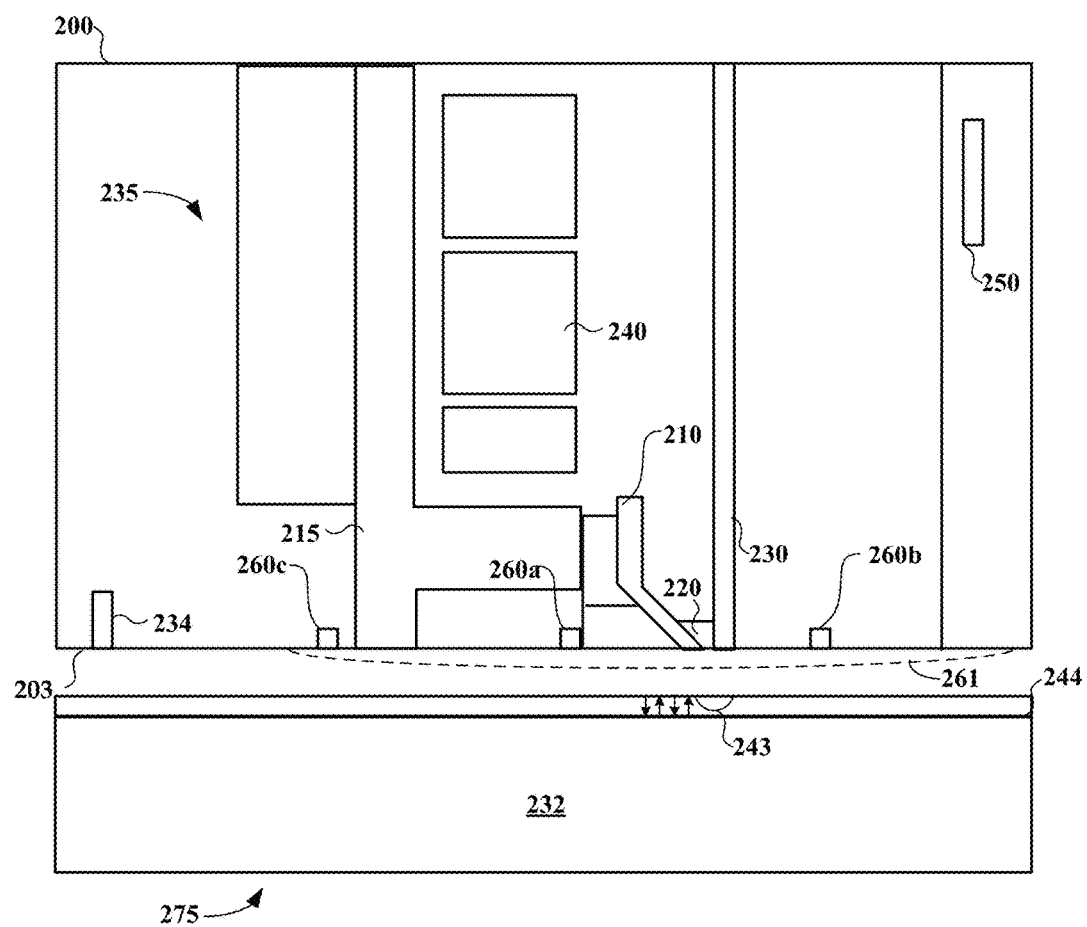
FIG. 2 is a cross-sectional view of a slider assembly according to embodiments discussed herein.

In FIG. 2, a cross-section diagram shows a slider 200 according to various embodiments. The head transducer 200 is shown positioned over a writeable medium 275 (e.g., magnetic disk) and generally includes a substrate 232 on which at least a hard magnetic layer 244 is deposited or otherwise formed. An NFT 220 is located between a write pole 210 and a waveguide 230 at a media-facing surface 203. A small portion or spot 243 of the layer 244 is heated via waveguide 230 and NFT 220 to reduce the coercivity of the material enough so that the magnetic field from the magnetic write pole 210 is strong enough to change the magnetization direction of the recording layer 244. Bits of information may then be recorded in the form of a perpendicular upward/downward magnetization direction for a series of magnetic domains in the layer 244.

The portion of head transducer 200 illustrated in FIG. 2 may include a number of heat generating components at the media-facing surface 203, such as write coil 240, NFT 220, and a heater 250. Due to thermal expansion of the surrounding material (e.g., dielectric material), the heat can cause a thermal protrusion at the media-facing surface 203, indicted by dashed line 261. Generally, the heater 250 is used to finely adjust head-media spacing near the protrusion to obtain a desired spacing between the media 275 and read/write transducers 234, 235.

This head-media spacing can also be referred to as the slider's fly height. It is often desirable to have a relatively small distance or spacing between a recording head transducer and its associated medium. By reducing the head-media spacing, a recording head transducer is typically better able to both write and read data to and from a medium. Reducing the head-media spacing also allows for surveying of recording medium topography, such as for detecting asperities and other features of the recording medium surface.

One or more thermal sensors, e.g., temperature coefficient of resistance (TCR) sensors or dual-ended temperature coefficient of resistance (DETCR) sensors, can be located within a protrusion region at one or more optional locations. Historically these sensors have been used during manufacturing to set head-disk spacing or to detect thermal asperities (TA) on an associated medium during a certification process. As shown in FIG. 2, optional thermal sensors 260a, 260b, 260c are located at different locations within the region of protrusion 261. In many embodiments, only one thermal sensor is used. In some embodiments, as illustrated by thermal sensor 260a, a thermal sensor is located in the region of the writer 235, near the write pole 210, return pole 215, and/or the NFT 220. A thermal sensor may also be located proximate the reader if used primarily for thermal asperity detection.

Thermal sensors 260a, 260b, 260c are coupled to signal processing circuitry as is known in the art. The circuitry determines temperatures at or near the media-facing surface 203, and those measured temperatures can be used for a number of purposes, such as controlling the heater 250 to adjust head-media spacing at the protrusion region 261. It has been demonstrated that for a head transducer having a thermal sensor reasonably close to the NFT 220, it is possible to measure changes in thermal conductance across the head-disc interface and to use this to monitor changes, such as those due to clearance changes or due to contamination. These sensors are discussed further below.

Figure 3:
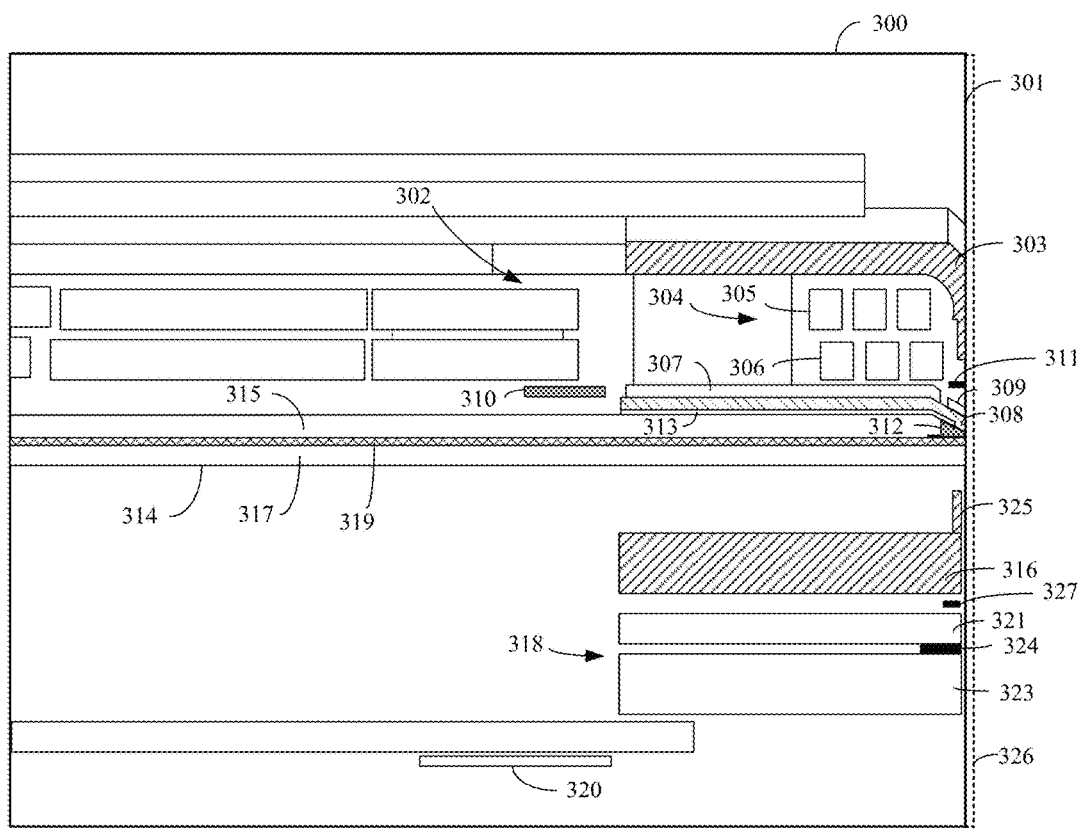
FIG. 3 is a cross-sectional view of portions of a slider body near an air-bearing surface according to embodiments discussed herein.

In FIG. 3, a cross-sectional view illustrates portions of the slider body 300 near the media-facing ABS 301 in further detail according to various embodiments. A writer 302 includes a number of components, including a second return pole 303 proximate a write coil 304. The write coil 304 includes an upper coil 305 and a lower coil 306. The write coil 304 may conform to any writer coil design, including a double-pancake design, single-layer pancake design, or a helical coil design, for example.

The write coil 304 is configured to energize a write pole 308. A magnetic yoke 307 is disposed between the write coil 304 and the write pole 308. A write pole heat sink 309 is thermally coupled to the write pole 308. A writer heater 310 is positioned proximate the write pole 308 and is configured to thermally actuate the write pole 308 during write operations. An NFT 312 is situated proximate the write pole 308 and is optically coupled to an optical waveguide 314. The waveguide 314 includes an upper cladding layer 315, a lower cladding layer 317, and a core 319 between the upper and lower cladding layers 315, 317. A diffuser 313 thermally couples to the NFT 312 and extends between at least a portion of the write pole 308 and the upper cladding layer 315. The writer 302 also includes a leading shield 325 and a first return pole 316, which is magnetically coupled to the write pole 308 and the second return pole 303. The slider 300 also includes a reader 318. The reader 318 includes a read element 324 (e.g., a GMR sensor) disposed between a pair of reader shields 321, 323. A reader heater 320 is located proximate the reader 318, which is configured to thermally actuate the reader 318 during read operations.

A contact sensor 311 is positioned at or near the ABS 301 near the write coil 304. More particularly, the contact sensor 311 is positioned proximate the write coil 304 and the write pole 308. At this location, the contact sensor 311 is arranged to detect contact between a close point of the writer 302 (when thermally actuated by one or more heating elements) and a magnetic recording medium. The slider 300 also includes a contact sensor 327 positioned proximate the reader 318. The contact sensor 327 is configured to detect contact between a close point of the reader 318 (when thermally actuated by one or more heating elements) and the recording medium. In some embodiments, the writer contact sensor 311 is coupled (in series or in parallel) to the reader contact sensor 327. In other embodiments, the writer and reader contact sensors 311 and 327 are independent of each other. A protective coating 326 covers at least a portion of the ABS 301 including the writer 302, reader 318, NFT 312, and contact sensor 311, 327.

The contact sensors 311, 327 are typically thermal sensors such as a resistance temperature sensor. In certain embodiments, the contact sensors 311, 327 are resistance temperature sensors having, respectively, a temperature coefficient of resistance, and are referred to herein as TCR sensors. In further embodiments, the contact sensors 311, 327 can be implemented as a DETCR sensor. The TCR sensors 311, 327 are configured to sense changes in heat flow for detecting onset of head-medium contact. As mentioned above, the sensed contact may either be with the recording medium due to a too-low fly-height and/or may be due to contamination (e.g., asperities) on the recording medium surface.

Figure 4:
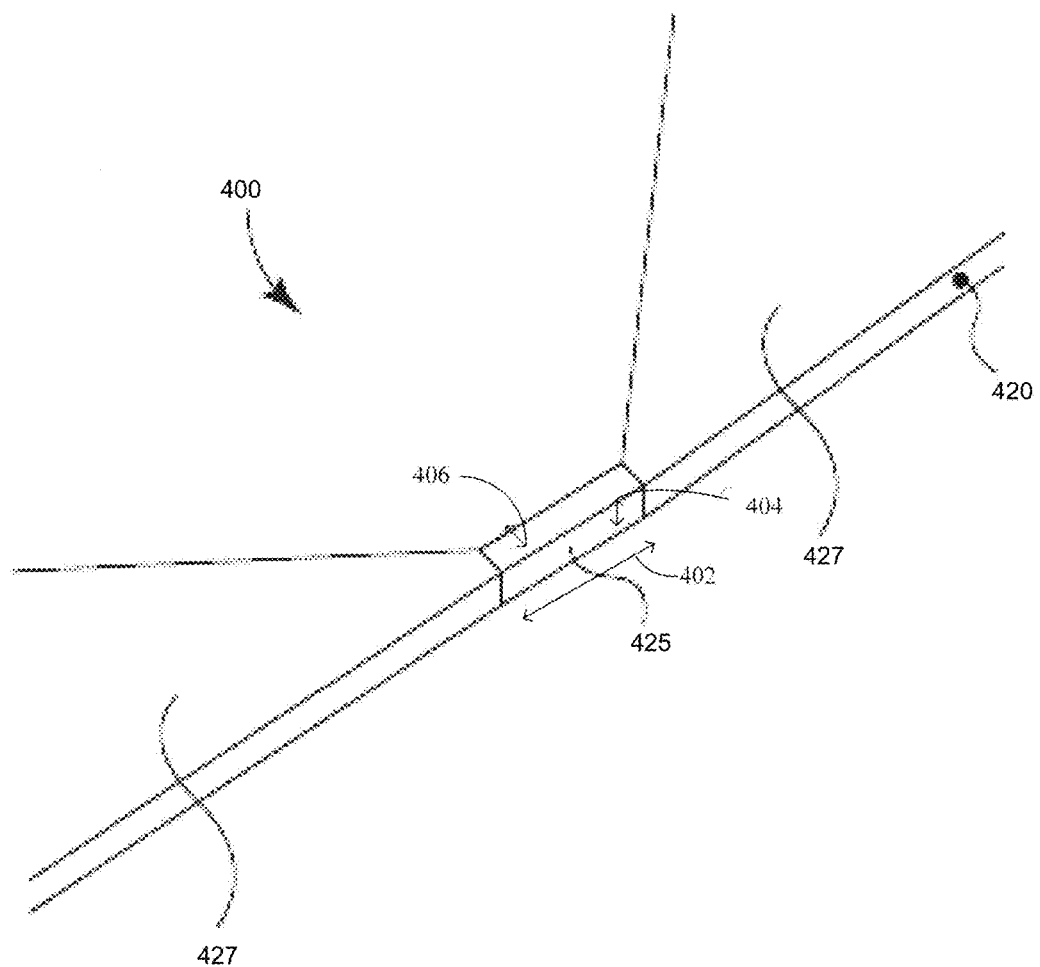
FIG. 4 illustrates a resistance temperature sensor according to embodiments discussed herein.

FIG. 4 shows an example of a TCR sensor 400 according to embodiments described herein. The TCR sensor 400 has a TCR wire 425 with adjacent contacts 427. A surface of the TCR wire 425 and contacts 427 are situated on the media-facing ABS 420 of the slider. The ABS 420 includes a slider overcoat layer. The contacts 427 may have the same down track thickness as the TCR wire 425 with a slowly increasing-into-slider height. Alternatively, the down track width and into-slider height of the contacts can be significantly increased, which results in a decrease in the resistance of the contacts, for a low-contacts sensitivity TCR wire sensor. The relative alignment and positioning of the respective TCR wire 425 and contacts 427, and the geometries of these elements, may be varied to achieve specified asperity and head-media spacing and/or contact detection performance characteristics.

According to various embodiments, a TCR sensor 400 is provided at a head transducer configured to interact with a magnetic recording medium. The TCR sensor 400 has a sensor resistance, and is configured to operate at a temperature above ambient temperature. The TCR sensor 400 is responsive to changes in spacing between the sensor 400 and the medium, collision with asperities of the medium, and head-medium contact, for example. Electrically conductive contacts 427 are connected to the TCR sensor 400 and have a contact resistance. The contacts 427 have a cross-sectional area adjacent to the sensor 400 larger than that of the sensor 400, such that the contact resistance is small relative to the sensor resistance and negligibly contributes to a signal generated by the TCR sensor 400. Preferably, the resistance of the contacts 427 is negligible relative to that of the TCR sensor 400.

In various embodiments, the sensor element 425 and contacts 427 of a TCR sensor 400 may define different regions of a unitary TCR structure. For example, the TCR sensor 400 may have opposing ends between which a TCR sensor element 425 is located. The opposing ends of the TCR sensor 400 can have a cross-sectional area larger than that of the sensor element 425. In such embodiments, the contacts 427 comprise or otherwise include the opposing ends of the sensor 400. However, in FIG. 4, the TCR wire sensor is shown to have narrow contacts 427. The contacts 427 are respectively coupled to a detector configured to detect head-media contact based on a signal generated by TCR sensor element 425.

According to various embodiments, the contacts 427 may have a cross-sectional area adjacent to the TCR sensor element 425 which is larger than that of the sensor element 425 by a factor ranging between 1 and 1000. In various embodiments, the contact resistance is smaller than the sensor resistance by a factor ranging between 1 and 1000. In various embodiments, the TCR sensor element 425 is configured to operate at a temperature ranging between about 25 and 300° C., with a typical operating temperature of about 100° C. In other embodiments, the TCR sensor element 425 is configured to operate at a temperature ranging between about 0 and 300° C. above an ambient temperature of the magnetic recording medium and surrounding environment, which typically ranges between 25 and 75° C.

However, when the thermal sensor is used in HAMR to detect, for example, thermal asperities of the medium, the sensor is biased at voltage sufficient to create a temperature offset with the asperities as a result of Joule heating. These temperatures are greater than the temperature at which the slider overcoat degrades. For example, diamond-like carbon (DLC), a typical overcoat material, degrades at about 135-150° C. While the degradation temperature is dependent upon the thickness of the overcoat, the overcoat thicknesses for HAMR sliders are significantly less than previous thicknesses. The overcoat thickness for magnetic recording sliders used to be greater than 20 Å. However, due to the reduced head-media spacing utilized in HAMR, the slider overcoat is no more than 20 Å, and likely, no more than 15 Å. The reduced overcoat thickness, combined with the increased temperature offset of the thermal sensor degrades the overcoat layer proximate the sensor leaving the thermal sensor, e.g., a reader DETCR, exposed to the environment. Since current thermal sensors are typically comprised of NiFe, once unprotected by the overcoat, the sensor oxidizes. The oxidation leads to sensor protrusion that can result in mechanical engagement with the recording medium and generation of electrical noise. However, even without oxidation, the sensor may protrude where the overcoat has been removed. In addition to the decreased overcoat thickness, HAMR recording media tends to have an increased number of asperities (e.g., greater surface roughness and flaws). Under HAMR conditions, the thermal sensor may not survive a certification test. While the sensor bias voltage range may be restricted to mitigate the overcoat degradation, this results in an unacceptable loss of thermal asperity detection fidelity.

HAMR slider thermal sensors comprise materials having high temperature coefficients of resistance, high bias capability, and relative availability for recording head wafer fabrication. Conventional thermal sensors have employed a NiFe alloy as the active element. However, in the absence of the slider overcoat, the NiFe oxidizes. Embodiments described herein include HAMR slider thermal sensors comprising active elements of noble metals. For example, the active sensor material is replaced with at least one metal from the following: Ru, Rh, Pd, Os, Ir, and Pt. These noble metals have a high melting point (e.g., above 1500° C., bulk value) and a non-zero temperature coefficient of resistivity.

The thin film fabrication of HAMR slider thermal sensors affects the sensor's temperature coefficient of resistivity. Therefore, the sensor dimensions can affect the sensor's performance. For example, the thicker the sensor, the more bulk-like the sensor material behaves (e.g., the surfaces aren't as involved in the mean free path of the material). The thickness of the sensor refers to the down-track dimension at the ABS and is represented by arrow 404 in FIG. 4. The sensors described herein have a thickness of about 35-75 nm, or of about 45-65 nm, or of about 45-50 nm. In addition to the sensor thickness 404, the length of the sensor is denoted by arrow 402 and the height of the sensor (distance extending into the body of the slider) is indicated by arrow 406. Sensors described herein have a length of about 750 nm and height of about 30-90 nm, or in certain embodiments, no more than about 40 nm. Using these dimensions, various noble metals are employed for the active sensor element to replace NiFe.

Previously employed NiFe dual DETCR design (e.g., includes two sensor elements) sensors provide acceptable performance but poor reliability with a bias voltage of 480 mV. In contrast, the NiFe sensors provide acceptable reliability but poor performance with a bias voltage of 400 mV. Therefore, sensors that match the performance of the NiFe sensors while improving reliability are viable options. To compare with the NiFe dual DETCR design sensors, single DETCR design sensors in various materials and bias voltages (adjusted for the single design) were explored. The voltage bias was ramped for each material to achieve comparable performance (e.g., thermal asperity detection fidelity) while determining whether sensor protrusion related noise was abated.

Figure 5:
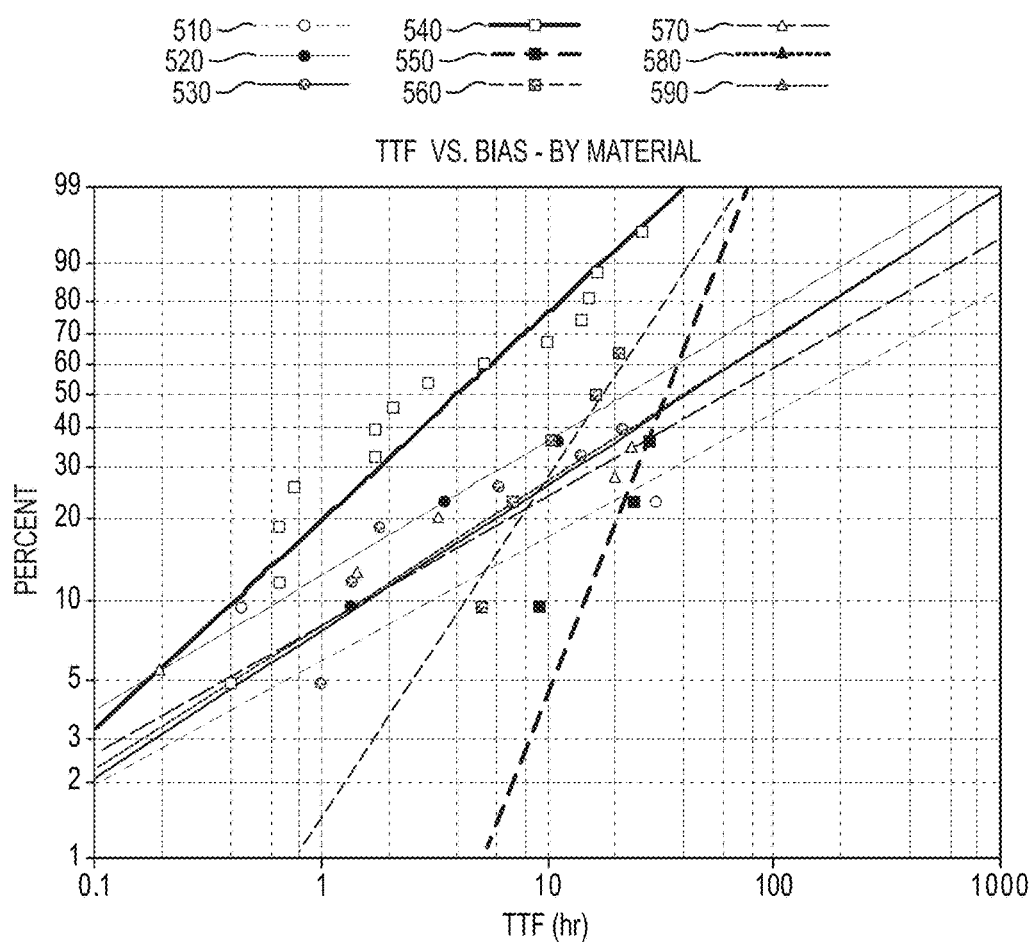
FIG. 5 is a chart showing the time to failure (TTF) as a function of applied bias voltage for resistive temperature sensors of different materials according to embodiments discussed herein.

FIG. 5 is a chart illustrating the time to protrusion related failure as a function of various materials and bias voltages for HAMR slider thermal contact sensors. The chart includes results for sensors comprising Ir, NiFe, Pt, and Rh. Each material was tested at a voltage bias of 243 mV (Ir at line 510, NiFe at line 530, Pt at line 550, and Rh at line 580) and at 295 mV (Ir at line 520, NiFe at line 540, Pt at line 560, and Rh at line 590). Platinum was also tested at a bias voltage of 330 mV (line 570). As shown, the low bias distributions (510, 530, 550, and 580) have improved times to failure as compared with the high bias distributions (520, 540, 560, and 590). Platinum has the highest low-tail time to failure values (550, 560) at the two standard bias conditions of 243 and 295 mV. The 330 mV Pt 570 results are the most similar to those of the low biased NiFe distribution 530, and NiFe appears to have the worst performance at these bias levels. In addition, none of the low-bias Rh sensors failed, but the high bias Rh sensors had the second worst time to failure results. The following figures address further performance comparisons.

Figure 6:
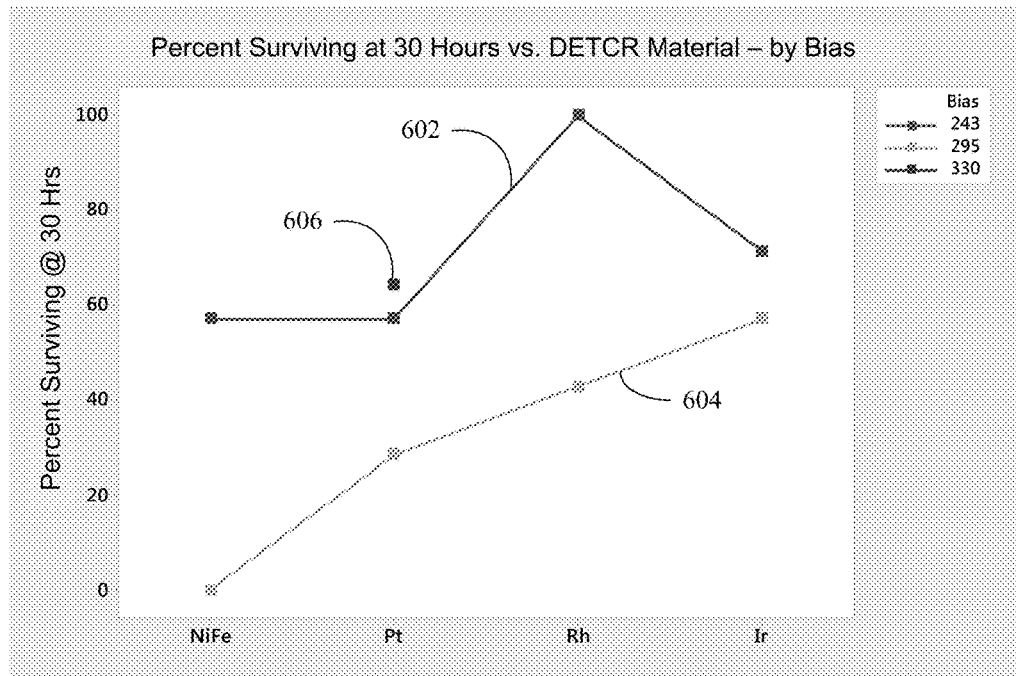
FIG. 6 is a chart showing the percentage of resistive temperature sensors of different materials surviving thirty hours of operation as a function of applied bias voltage according to embodiments discussed herein.

FIG. 6 illustrates the percent of sensors surviving after thirty hours of operation as a function of both material and bias voltage. The sensors having a bias voltage of 243 mV are represented by line 602, and the sensors having a bias voltage of 295 mV are represented by line 604. The Pt sensors having a bias voltage of 330 mV are represented by dot 606. As shown, more sensors at the lower bias voltage 602 survive at thirty hours of operation as compared with those at the higher bias voltage 604. Also, the survival percentage for the Pt 330 mV group 606 is comparable, or about equivalent, to the survival percentage for the NiFe low biased sensors.

Figure 7:
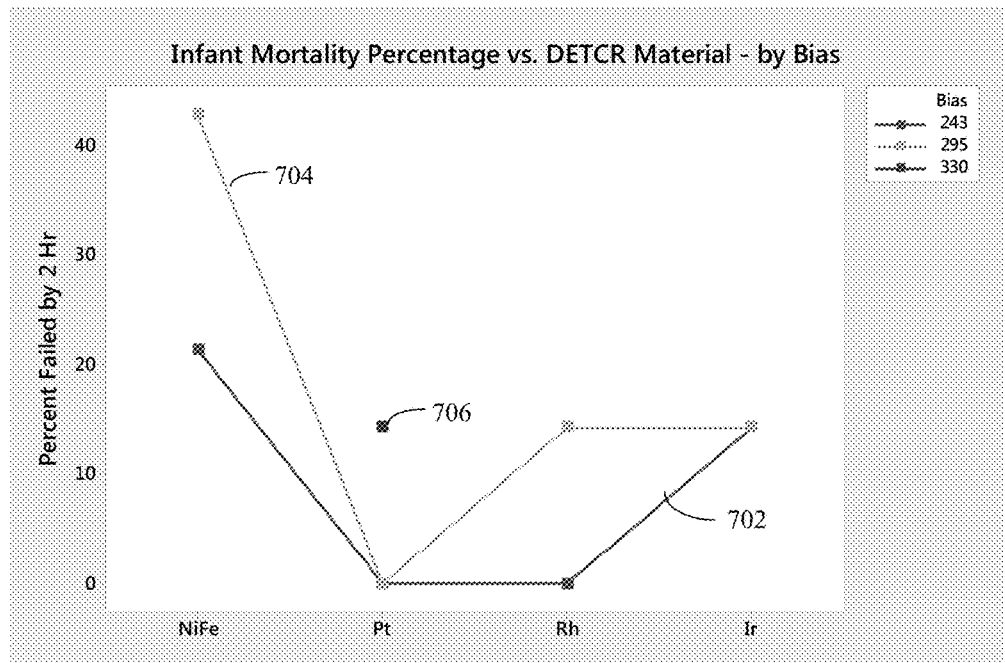
FIG. 7 is a chart showing the percentage of resistive temperature sensors of different materials failing by two hours of operation as a function of applied bias voltage according to embodiments discussed herein.

At the other end of the reliability spectrum, FIG. 7 illustrates the percent of sensors failing after two hours of operation as a function of both material and bias voltage. The sensors having a bias voltage of 243 mV are represented by line 702, and the sensors having a bias voltage of 295 mV are represented by line 704. The Pt sensors having a bias voltage of 330 mV are represented by dot 706. The highest mortality experienced by any group was that of the high biased NiFe sensors. There were no failures for the Pt sensors at either of the standard voltage biases (243 and 295 mV) or for the low biased Rh sensors. Again, the Pt sensors biased at 330 mV 706 have a comparable failure rate to the low biased NiFe sensors. Both the Rh and Ir failure rates were less than the NiFe rates, but they were also greater than the standard voltage biased Pt sensors.

Figure 8:
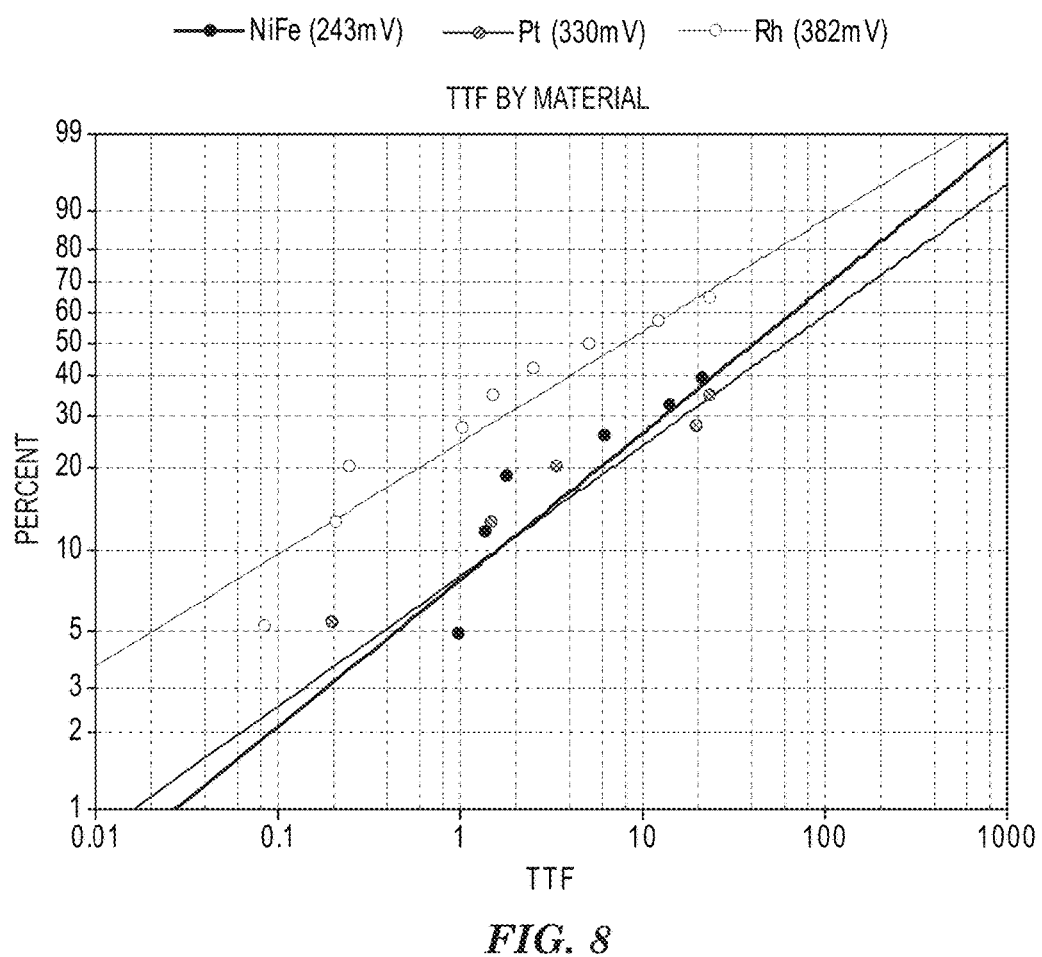
FIG. 8 is a chart showing the time to failure for resistive temperature sensors of different materials and applied bias voltages according to embodiments discussed herein.

FIG. 8 compares the time to failure of low-biased NiFe sensors with high-biased alternative materials. The NiFe sensors were biased at 243 mV and are denoted with line 810. The Pt sensors were biased at 330 mV as identified by line 820, and the Rh sensors were biased at 382 mV as identified by line 830. While both the high-biased Pt and Rh sensors produce similar thermal asperity scans as NiFe sensors biased at 295 mV, the Rh performance differs from the low-biased NiFe sensors. As can be seen, the Pt sensors 820 have comparable results as the low-biased NiFe sensors, but the Rh sensors 830 have decreased performance (e.g., increased failure rates). While any of the above-mentioned noble metals could replace NiFe in a HAMR slider thermal sensor, both Pt and Rh can provide comparable performance, as discussed further below.

Figure 9:
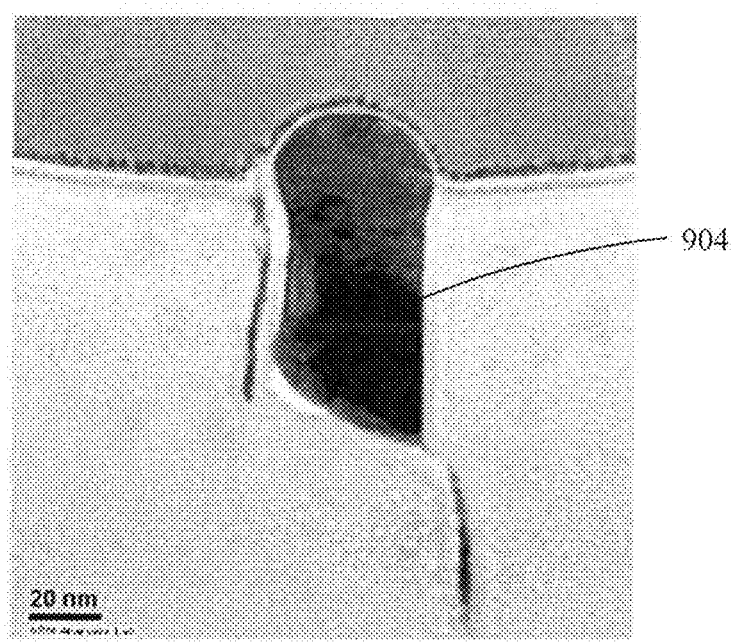
FIG. 9 is a microscope scan of a resistive temperature sensor showing poor adhesion implication.

Platinum active sensing elements can provide comparable performance and reliability to NiFe sensors. A reader only (single design) Pt DETCR biased at 330 mV has comparable performance (thermal asperity detection fidelity) as compared with a reader only NiFe DETCR biased at 295 mV, and both of these performances are comparable to a dual DETCR biased with 480 mV. The 330 mV biased Pt reader only DETCR also has comparable reliability as compared with a NiFe reader only sensor biased at 243 mV. However, the increased bias at 330 mV can cause the Pt sensor to protrude from the surrounding dielectric (e.g., alumina) of the slider. An example of this protrusion is shown in FIG. 9, where a Pt DETCR 904 protrudes toward the ABS. This protrusion implies that the Pt DETCR 904 has poor adhesion with the slider body. To remedy, or mitigate, the protrusion one or more adhesion layers are introduced to the slider.

Figure 10:
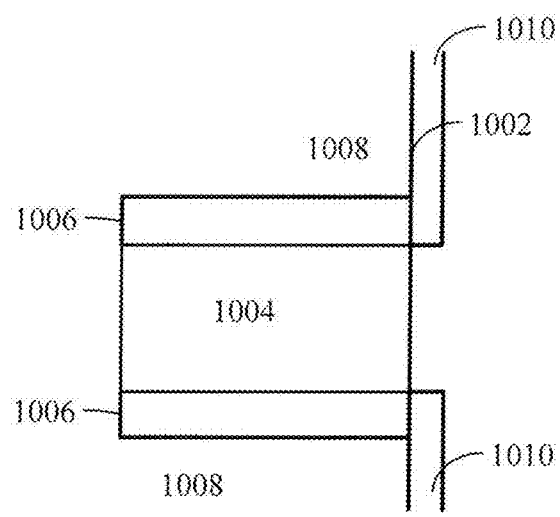
FIG. 10 is a cross-sectional view of a resistive temperature sensor according to embodiments discussed herein.

FIG. 10 illustrates a thermal sensor 1004, e.g., a Pt sensor, located at the ABS 1002. Overcoat layer 1010 is illustrated as having a gap, or being degraded, proximate the sensor 1004 at the ABS 1002. The sensor 1004 could be a reader DETCR similar to sensor 327 of FIG. 3. One or more adhesion promotion layers 1006 (two are shown) may be deposited on the slider dielectric 1008 to prevent the sensor 1004 from protruding beyond the ABS 1002. Further adhesion layers may be proximate the internal surface of the sensor 1004, e.g., the surface opposite the ABS, and the adhesion layers may comprise multiple layer structures. The adhesion layers may comprise the same material or different materials, and such materials may comprise at least one of Cr, Ta, Zr, etc. While adhesion layers are discussed with respect to Pt sensors, they can be included with any of the thermal sensor materials described herein.

Rhodium active sensing elements were less reliable than NiFe, but they can provide comparable performance to NiFe sensors. A reader only (single design) Rh DETCR biased at 382 mV has comparable performance (thermal asperity detection fidelity) as compared with a reader only NiFe DETCR biased at 295 mV, and both of these performances are comparable to a dual DETCR biased with 480 mV. Since Rh has an allowed life limit of 408 mV, it is an attractive material for thermally robust HAMR sliders. To improve the reliability of a Rh thermal sensor, a thicker film would increase the sensor's temperature coefficient of resistance. Therefore, a thicker Rh sensor should be used. For example, a thickness, as described above in connection with FIG. 4, of at least 35 nm and preferably about 45-75 nm should be employed.

As discussed above, a variety of alternative materials can replace NiFe in a HAMR slider thermal sensor. These materials resist oxidation when the slider overcoat material disappears and the sensor is exposed to the HAMR recording environment. Alternatively, if NiFe remains as the sensor active element material, a thin (~5 Å) seedlayer (e.g., Al) may be included at the ABS. The seedlayer forms a self-healing passivation layer at the ABS. Each of these approaches maintains the performance and reliability of a HAMR slider thermal sensor when the slider overcoat layer degrades thereby leaving the sensor unprotected from the recording environment.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality. Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider comprising an air bearing surface (ABS) and configured for heat-assisted magnetic recording, the slider comprising:
   a writer and a reader at the ABS;
   a near-field transducer (NFT) proximate the writer;
   an optical waveguide optically coupled to a laser source and the NFT;
   a sensor configured to contact and sense thermal asperities of a magnetic recording medium, the sensor formed from one of Ru, Rh, Pd, Os, Ir, and Pt;
   a protective coating covering at least a portion of the ABS including the writer, reader, NFT, and sensor; and
   the sensor is configured to operate at a temperature that degrades the protective coating and exposes the sensor leaving the sensor unprotected.

2. The apparatus of claim 1, wherein the protective coating has a thickness of about 20 Å or less.

3. The apparatus of claim 1, wherein the protective coating comprises a diamond-like carbon coating.

4. The apparatus of claim 1, wherein the sensor is biased to operate at a temperature between about 135° C. and 200° C.

5. The apparatus of claim 1, wherein the sensor has a thickness of between about 35 nm and 75 nm.

6. The apparatus of claim 5, wherein the sensor has a height into the slider of between about 30 nm and 90 nm.

7. The apparatus of claim 1, wherein the sensor is situated proximate the reader.

8. An apparatus, comprising:
   a slider comprising an air bearing surface (ABS) and configured for heat-assisted magnetic recording, the slider comprising:
   a writer and a reader at the ABS;
   a near-field transducer (NFT) proximate the writer;
   an optical waveguide optically coupled to a laser source and the NFT;
   a sensor configured to contact and sense thermal asperities of a magnetic recording medium, the sensor surrounded at least in part by a dielectric material and formed from one of Ru, Rh, Pd, Os, Ir, and Pt;
   an adhesion layer disposed between the sensor and the dielectric material;
   a protective coating covering at least a portion of the ABS including the writer, reader, NFT, and sensor; and
   the sensor is configured to operate at a temperature that degrades the protective coating and exposes the sensor leaving the sensor unprotected.

9. The apparatus of claim 8, wherein the adhesion layer inhibits displacement of the sensor toward the ABS.

10. The apparatus of claim 8, wherein the adhesion layer comprises one of Cr, Zr, and Ta.

11. The apparatus of claim 8, wherein the protective coating has a thickness of about 20 Å or less.

12. The apparatus of claim 8, wherein the protective coating comprises a diamond-like carbon coating.

13. The apparatus of claim 8, wherein the sensor is biased to operate at a temperature between about 135° C. and 150° C.

14. The apparatus of claim 8, wherein the sensor has a thickness of between about 35 nm and 75 nm.

15. The apparatus of claim 14, wherein the sensor has a height into the slider of between about 30 nm and 50 nm.

16. The apparatus of claim 8, wherein the sensor is situated proximate the reader.

17. An apparatus, comprising:
   a slider comprising an air bearing surface (ABS) and configured for heat-assisted magnetic recording, the slider comprising:
   a writer and a reader at the ABS;
   a near-field transducer (NFT) proximate the writer;
   an optical waveguide optically coupled to a laser source and the NFT; and
   a sensor configured to contact and sense thermal asperities of a magnetic recording medium, the sensor formed from one of Ru, Rh, Pd, Os, Ir, and Pt;
   a protective coating covering at least a portion of the ABS including the writer, reader, NFT, and sensor; and
   the sensor configured to operate at a temperature between about 135° C. and 150° C. which degrades the protective coating and exposes the sensor leaving the sensor unprotected.

18. The apparatus of claim 17, wherein the protective coating has a thickness of about 20 Å or less.

* * * * *